United States Patent
Satou

(10) Patent No.: US 11,489,612 B2
(45) Date of Patent: *Nov. 1, 2022

(54) LIGHT WAVELENGTH SEPARATION DEVICE AND LIGHT WAVELENGTH SEPARATION METHOD

(71) Applicant: NEC CORPORATION, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,021

(22) Filed: May 24, 2021

(65) Prior Publication Data
US 2021/0281348 A1    Sep. 9, 2021

Related U.S. Application Data

(63) Continuation of application No. 16/629,666, filed as application No. PCT/JP2018/027370 on Jul. 20, 2018, now Pat. No. 11,044,034.

(30) Foreign Application Priority Data

Jul. 28, 2017    (JP) ................................ 2017-146888

(51) Int. Cl.
H04J 14/02    (2006.01)
H04Q 11/00    (2006.01)

(52) U.S. Cl.
CPC ...... H04J 14/0212 (2013.01); H04Q 11/0005 (2013.01); H04Q 2011/0016 (2013.01); H04Q 2011/0058 (2013.01)

(58) Field of Classification Search
CPC ............. H04J 14/0212; H04Q 11/0005; H04Q 2011/0016; H04Q 2011/0058

(Continued)

(56) References Cited

U.S. PATENT DOCUMENTS 8,538,267 B2 *  9/2013  Ji .................... H04J 14/0217
                                                    398/83
11,044,034 B2 *  6/2021  Satou ................. H04J 14/0208
(Continued)

FOREIGN PATENT DOCUMENTS

CN    101668239        3/2010
CN    102970101 A      3/2013
(Continued)

OTHER PUBLICATIONS

Communication dated Aug. 3, 2020 from European Patent Office in EP Application No. 18837514.1.

(Continued)

*Primary Examiner* — Dalzid E Singh
(74) *Attorney, Agent, or Firm* — Sughrue Mion, PLLC

(57) ABSTRACT

To provide a light wavelength separation device and a light wavelength separation method that can be flexibly adapted for various channel intervals of a wavelength-division multiplexed (WDM) signal, a light wavelength separation circuit is provided with: an optical coupler which splits a wavelength-multiplexed optical signal in which optical signals of a plurality of channels are multiplexed; a band-pass filter which is arranged for each of output ports of the optical coupler, separates optical signals included in the wavelength-multiplexed optical signal inputted from the output ports of the optical coupler into channels of which the central frequencies are not adjacent to each other, and outputs the separated optical signals from respectively different output ports; and an optical switch which selects one of paths of the optical signals inputted from the output ports of each band-pass filter.

12 Claims, 12 Drawing Sheets

(58) Field of Classification Search
USPC .......................................................... 398/50
See application file for complete search history.

(56) References Cited

U.S. PATENT DOCUMENTS

| | | |
|---|---|---|
| 2009/0110396 A1 | 4/2009 | Levner et al. |
| 2011/0262143 A1 | 10/2011 | Ji et al. |
| 2013/0142510 A1 | 6/2013 | Zhou |
| 2013/0251367 A1 | 9/2013 | Ishii et al. |
| 2014/0023371 A1 | 1/2014 | Nanjo |
| 2016/0381441 A1 | 12/2016 | Nagamine et al. |
| 2019/0028785 A1 | 1/2019 | Sato et al. |
| 2021/0105080 A1* | 4/2021 | Inoue .................. H04J 14/0209 |

FOREIGN PATENT DOCUMENTS

| | | |
|---|---|---|
| CN | 103404058 A | 11/2013 |
| EP | 2 919 404 B1 | 7/2016 |
| JP | 2008-259132 A | 10/2008 |
| JP | 2009-210841 A | 9/2009 |
| JP | 2010-098545 A | 4/2010 |
| WO | 2012/163301 A1 | 12/2012 |

OTHER PUBLICATIONS

Communication dated Oct. 10, 2020 from the China National Intellectual Property Administration in Application No. 201880047521.9.
International Search Report of PCT/JP2018/027370 dated Oct. 9, 2018 [PCT/ISA/210].
Written Opinion of PCT/JP2018/027370 dated Oct. 9, 2018 [PCT/ISA/237].
Japanese Office Action for JP Application No. 2019-532573 mailed on Mar. 2, 2021.
Chinese Office Communication for CN Application No. 201880047521.9 dated Sep. 23, 2021 with English Translation.

* cited by examiner

Fig.2

| CHANNEL NUMBER | CENTER FREQUENCY [GHz] | CENTER WAVELENGTH [nm] |
|---|---|---|
| Ch1 | 193100.0 | 1552.524 |
| Ch2 | 193060.0 | 1552.846 |
| Ch3 | 193020.0 | 1553.168 |
| Ch4 | 192980.0 | 1553.490 |
| Ch5 | 192940.0 | 1553.812 |
| Ch6 | 192900.0 | 1554.134 |
| Ch7 | 192860.0 | 1554.456 |
| Ch8 | 192820.0 | 1554.779 |
| Ch9 | 192780.0 | 1555.101 |
| Ch10 | 192740.0 | 1555.424 |

Fig.3

| CHANNEL NUMBER | BAND-PASS FILTER RANGE SETTING ||||||
|---|---|---|---|---|---|---|
| | TRANSMISSION START || CENTER || TRANSMISSION TERMINATION ||
| | FREQUENCY [GHz] | WAVELENGTH [nm] | FREQUENCY [GHz] | WAVELENGTH [nm] | FREQUENCY [GHz] | WAVELENGTH [nm] |
| Ch1 | 193120.0 | 1552.364 | 193100.0 | 1552.524 | 193080.0 | 1552.685 |
| Ch2 | 193080.0 | 1552.685 | 193060.0 | 1552.846 | 193040.0 | 1553.007 |
| Ch3 | 193040.0 | 1553.007 | 193020.0 | 1553.168 | 193000.0 | 1553.329 |
| Ch4 | 193000.0 | 1553.329 | 192980.0 | 1553.490 | 192960.0 | 1553.651 |
| Ch5 | 192960.0 | 1553.651 | 192940.0 | 1553.812 | 192920.0 | 1553.973 |
| Ch6 | 192920.0 | 1553.973 | 192900.0 | 1554.134 | 192880.0 | 1554.295 |
| Ch7 | 192880.0 | 1554.295 | 192860.0 | 1554.456 | 192840.0 | 1554.618 |
| Ch8 | 192840.0 | 1554.618 | 192820.0 | 1554.779 | 192800.0 | 1554.940 |
| Ch9 | 192800.0 | 1554.940 | 192780.0 | 1555.101 | 192760.0 | 1555.263 |
| Ch10 | 192760.0 | 1555.263 | 192740.0 | 1555.424 | 192720.0 | 1555.586 |

Fig.4

| CHANNEL NUMBER | OUTPUT PORT OF LIGHT WAVELENGTH SEPARATION CIRCUIT 100 | OPTICAL SWITCH SELECTION POSITION |
|---|---|---|
| Ch1 | 41 | WSS102 SIDE |
| Ch2 | 42 | WSS103 SIDE |
| Ch3 | 43 | WSS102 SIDE |
| Ch4 | 44 | WSS103 SIDE |
| Ch5 | 45 | WSS102 SIDE |
| Ch6 | 46 | WSS103 SIDE |
| Ch7 | 47 | WSS102 SIDE |
| Ch8 | 48 | WSS103 SIDE |
| Ch9 | 49 | WSS102 SIDE |
| Ch10 | 50 | WSS103 SIDE |

Fig.5

| CHANNEL NUMBER | OUTPUT PORT OF LIGHT WAVELENGTH SEPARATION CIRCUIT 100 | OPTICAL SWITCH SELECTION POSITION |
|---|---|---|
| Ch1 | 41 | WSS102 SIDE |
| Ch3 | 42 | WSS102 SIDE |
| Ch5 | 43 | WSS102 SIDE |
| Ch7 | 44 | WSS102 SIDE |
| Ch9 | 45 | WSS102 SIDE |
| Ch2 | 46 | WSS103 SIDE |
| Ch4 | 47 | WSS103 SIDE |
| Ch6 | 48 | WSS103 SIDE |
| Ch8 | 49 | WSS103 SIDE |
| Ch10 | 50 | WSS103 SIDE |

Fig.6

BAND-PASS FILTER RANGE SETTING OF WSS 102

| CHANNEL NUMBER | OPTICAL SIGNAL | | TRANSMISSION START | | CENTER | | TRANSMISSION TERMINATION | |
|---|---|---|---|---|---|---|---|---|
| | CENTER FREQUENCY [GHz] | CENTER WAVELENGTH [nm] | FREQUENCY [GHz] | WAVELENGTH [nm] | FREQUENCY [GHz] | WAVELENGTH [nm] | FREQUENCY [GHz] | WAVELENGTH [nm] |
| Ch1 | 193100.0 | 1552.524 | 193137.5 | 1552.223 | 193100.0 | 1552.524 | 193062.5 | 1552.826 |
| Ch2 | 193060.0 | 1552.846 | | | | | | |
| Ch3 | 193020.0 | 1553.168 | 193062.5 | 1552.826 | 193025.0 | 1553.128 | 192987.5 | 1553.429 |
| Ch4 | 192980.0 | 1553.490 | | | | | | |
| Ch5 | 192940.0 | 1553.812 | 192975.0 | 1553.530 | 192937.5 | 1553.832 | 192900.0 | 1554.134 |
| Ch6 | 192900.0 | 1554.134 | | | | | | |
| Ch7 | 192860.0 | 1554.456 | 192900.0 | 1554.134 | 192862.5 | 1554.436 | 192825.0 | 1554.739 |
| Ch8 | 192820.0 | 1554.779 | | | | | | |
| Ch9 | 192780.0 | 1555.101 | 192812.5 | 1554.839 | 192775.0 | 1555.142 | 192737.5 | 1555.444 |
| Ch10 | 192740.0 | 1555.424 | | | | | | |

BAND-PASS FILTER RANGE SETTING OF WSS 103

| CHANNEL NUMBER | OPTICAL SIGNAL | | TRANSMISSION START | | CENTER | | TRANSMISSION TERMINATION | |
|---|---|---|---|---|---|---|---|---|
| | CENTER FREQUENCY [GHz] | CENTER WAVELENGTH [nm] | FREQUENCY [GHz] | WAVELENGTH [nm] | FREQUENCY [GHz] | WAVELENGTH [nm] | FREQUENCY [GHz] | WAVELENGTH [nm] |
| Ch1 | 193100.0 | 1552.524 | | | | | | |
| Ch2 | 193060.0 | 1552.846 | 193100.0 | 1552.524 | 193062.5 | 1552.826 | 193025.0 | 1553.128 |
| Ch3 | 193020.0 | 1553.168 | | | | | | |
| Ch4 | 192980.0 | 1553.490 | 193012.5 | 1553.228 | 192975.0 | 1553.530 | 192937.5 | 1553.832 |
| Ch5 | 192940.0 | 1553.812 | | | | | | |
| Ch6 | 192900.0 | 1554.134 | 192937.5 | 1553.832 | 192900.0 | 1554.134 | 192862.5 | 1554.436 |
| Ch7 | 192860.0 | 1554.456 | | | | | | |
| Ch8 | 192820.0 | 1554.779 | 192862.5 | 1554.436 | 192825.0 | 1554.739 | 192787.5 | 1555.041 |
| Ch9 | 192780.0 | 1555.101 | | | | | | |
| Ch10 | 192740.0 | 1555.424 | 192775.0 | 1555.142 | 192737.5 | 1555.444 | 192700.0 | 1555.747 |

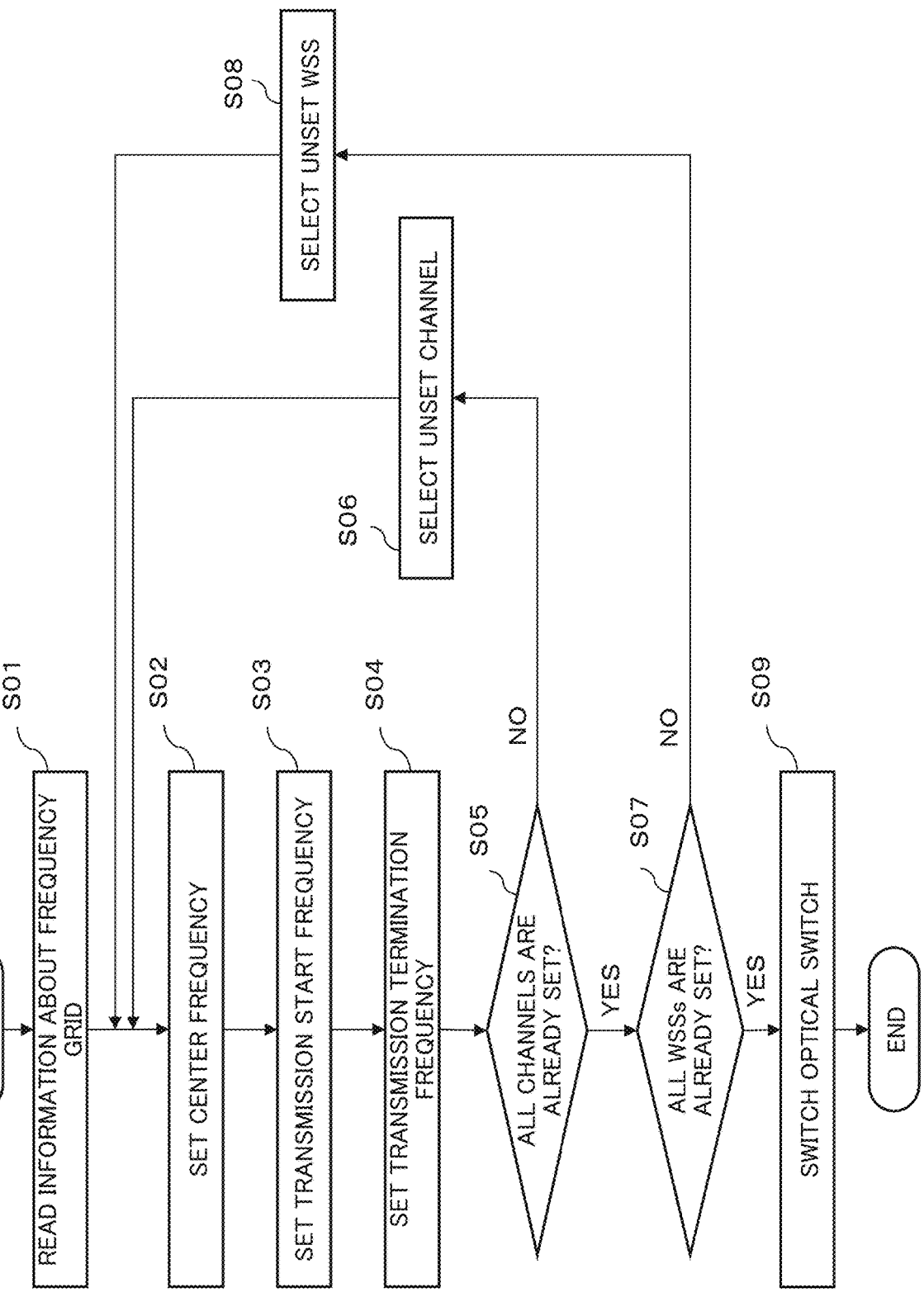

Fig.8

| CHANNEL NUMBER | BAND-PASS FILTER RANGE SETTING ||||||
| --- | --- | --- | --- | --- | --- | --- |
| | TRANSMISSION START || CENTER || TRANSMISSION TERMINATION ||
| | FREQUENCY [GHz] | WAVELENGTH [nm] | FREQUENCY [GHz] | WAVELENGTH [nm] | FREQUENCY [GHz] | WAVELENGTH [nm] |
| Ch1 | 193116.7 | 1552.391 | 193100.0 | 1552.524 | 193083.4 | 1552.658 |
| Ch2 | 193083.3 | 1552.659 | 193066.7 | 1552.792 | 193050.0 | 1552.926 |
| Ch3 | 193050.0 | 1552.927 | 193033.3 | 1553.061 | 193016.7 | 1553.195 |
| Ch4 | 193016.7 | 1553.195 | 193000.0 | 1553.329 | 192983.4 | 1553.463 |
| Ch5 | 192983.3 | 1553.463 | 192966.7 | 1553.597 | 192950.0 | 1553.731 |
| Ch6 | 192950.0 | 1553.731 | 192933.3 | 1553.866 | 192916.7 | 1554.000 |
| Ch7 | 192916.7 | 1554.000 | 192900.0 | 1554.134 | 192883.4 | 1554.268 |
| Ch8 | 192883.3 | 1554.268 | 192866.7 | 1554.403 | 192850.0 | 1554.537 |
| Ch9 | 192850.0 | 1554.537 | 192833.3 | 1554.671 | 192816.7 | 1554.806 |
| Ch10 | 192816.7 | 1554.806 | 192800.0 | 1554.940 | 192783.4 | 1555.074 |

Fig.9

| CHANNEL NUMBER | OPTICAL SIGNAL | | BAND-PASS FILTER RANGE SETTING OF WSS 102 | | | | | |
|---|---|---|---|---|---|---|---|---|
| | CENTER FREQUENCY [GHz] | CENTER WAVELENGTH [nm] | TRANSMISSION START | | CENTER | | TRANSMISSION TERMINATION | |
| | | | FREQUENCY [GHz] | WAVELENGTH [nm] | FREQUENCY [GHz] | WAVELENGTH [nm] | FREQUENCY [GHz] | WAVELENGTH [nm] |
| Ch1 | 193100.0 | 1552.524 | 193125.0 | 1552.323 | 193100.0 | 1552.524 | 193075.0 | 1552.725 |
| Ch2 | 193066.7 | 1552.792 | | | | | | |
| Ch3 | 193033.3 | 1553.061 | 193062.5 | 1552.826 | 193037.5 | 1553.027 | 193000.0 | 1553.329 |
| Ch4 | 193000.0 | 1553.329 | | | | | | |
| Ch5 | 192966.7 | 1553.597 | 193000.0 | 1553.329 | 192962.5 | 1553.631 | 192937.5 | 1553.832 |
| Ch6 | 192933.3 | 1553.866 | | | | | | |
| Ch7 | 192900.0 | 1554.134 | 192925.0 | 1553.933 | 192900.0 | 1554.134 | 192875.0 | 1554.335 |
| Ch8 | 192866.7 | 1554.403 | | | | | | |
| Ch9 | 192833.3 | 1554.671 | 192862.5 | 1554.436 | 192837.5 | 1554.638 | 192800.0 | 1554.940 |
| Ch10 | 192800.0 | 1554.940 | | | | | | |

| CHANNEL NUMBER | OPTICAL SIGNAL | | BAND-PASS FILTER RANGE SETTING OF WSS 103 | | | | | |
|---|---|---|---|---|---|---|---|---|
| | CENTER FREQUENCY [GHz] | CENTER WAVELENGTH [nm] | TRANSMISSION START | | CENTER | | TRANSMISSION TERMINATION | |
| | | | FREQUENCY [GHz] | WAVELENGTH [nm] | FREQUENCY [GHz] | WAVELENGTH [nm] | FREQUENCY [GHz] | WAVELENGTH [nm] |
| Ch1 | 193100.0 | 1552.524 | | | | | | |
| Ch2 | 193066.7 | 1552.792 | 193100.0 | 1552.524 | 193062.5 | 1552.826 | 193037.5 | 1553.027 |
| Ch3 | 193033.3 | 1553.061 | | | | | | |
| Ch4 | 193000.0 | 1553.329 | 193025.0 | 1553.128 | 193000.0 | 1553.329 | 192975.0 | 1553.530 |
| Ch5 | 192966.7 | 1553.597 | | | | | | |
| Ch6 | 192933.3 | 1553.866 | 192962.5 | 1553.631 | 192937.5 | 1553.832 | 192900.0 | 1554.134 |
| Ch7 | 192900.0 | 1554.134 | | | | | | |
| Ch8 | 192866.7 | 1554.403 | 192900.0 | 1554.134 | 192862.5 | 1554.436 | 192837.5 | 1554.638 |
| Ch9 | 192833.3 | 1554.671 | | | | | | |
| Ch10 | 192800.0 | 1554.940 | 192825.0 | 1554.739 | 192800.0 | 1554.940 | 192762.5 | 1555.243 |

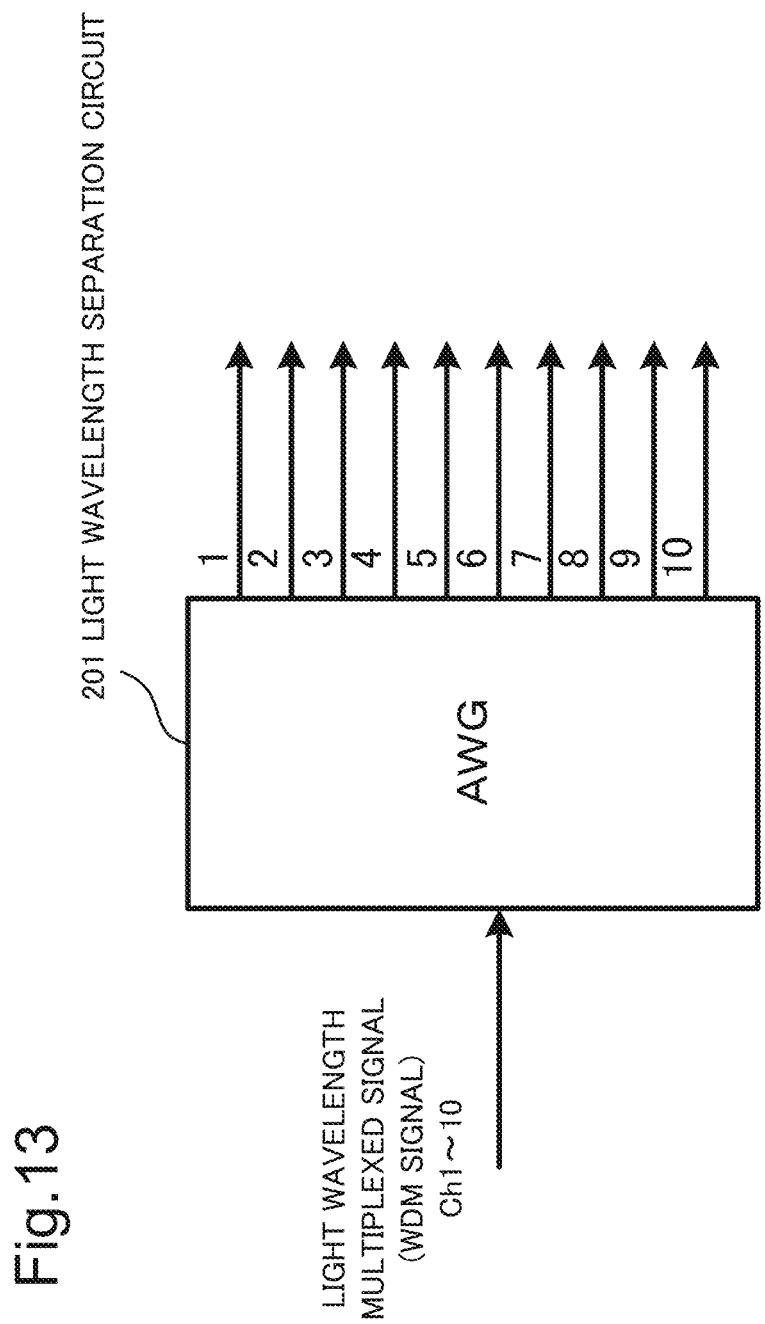

LIGHT WAVELENGTH SEPARATION DEVICE AND LIGHT WAVELENGTH SEPARATION METHOD

CROSS REFERENCE TO RELATED APPLICATIONS

This application is a Continuation of U.S. application Ser. No. 16/629,666 filed Jan. 9, 2020, which is a National Stage of International Application No. PCT/JP2018/027370 filed Jul. 20, 2018, claiming priority based on Japanese Application No. 2017-146888 filed Jul. 28, 2017, the contents of which are incorporated herein by reference in their entirety.

TECHNICAL FIELD

The present invention relates to a light wavelength separation device and a light wavelength separation method that separate an optical signal being wavelength-multiplexed.

BACKGROUND ART

A group of carrier frequencies used in a dense wavelength division multiplexing (DWDM) system is stipulated as a "frequency grid" in ITU-T Recommendation G.694.1. A channel interval of the frequency grid includes, for example, 100 GHz, 50 GHz, 25 GHz, and 12.5 GHz. Meanwhile, there may be a case where DWDM transmission is performed by using a frequency grid having a channel interval of 40 GHz or 33.3 GHz that is not in ITU-T Recommendation in order to prioritize utilization efficiency of frequencies in a submarine cable system. ITU-T represents Telecommunication Standardization Sector of International Telecommunication Union.

In relation to the present invention, PTL 1 describes an optical cross-connect system that includes an optical switch being disposed between wavelength selective switches (WSSs).

PTL 2 describes an optical transmission device in which an interleaver is disposed before and after a WSS.

CITATION LIST

Patent Literature

[PTL 1] Japanese Unexamined Patent Application Publication No. 2008-259132
[PTL 2] Japanese Unexamined Patent Application Publication No. 2010-098545

SUMMARY OF INVENTION

Technical Problem

FIG. 13 is a diagram illustrating a configuration example of a general light wavelength separation circuit 201. The light wavelength separation circuit 201 is an arrayed waveguide grating of one port input and 10 port outputs (1×10 AWG). The AWG has a band-pass filter characteristic in an optical path between the input port and each of the output ports, separates an optical signal (carrier) with a specific wavelength from an input wavelength multiplexed optical signal (hereinafter, referred to as a "WDM signal"), and outputs the optical signal. Further, a wavelength selective switch (WSS) has been developed in recent years. The WSS can set a band-pass filter characteristic between input ports and output ports for each port, based on a predetermined condition. For example, a WSS that can vary a center frequency of a band-pass filter between one input port and a plurality of output ports in steps of 6.25 GHz or 12.5 GHz is known. Furthermore, a WSS that can set a bandwidth of each output port in units of 6.25 GHz or 12.5 GHz is also known. However, frequency ranges of band-pass filters of output ports of a WSS cannot overlap one another.

In a land WDM transmission system in which a frequency grid of a WDM signal is stipulated to be 6.25 GHz or 12.5 GHz, a WSS instead of an AWG may be sometimes used as the light wavelength separation circuit 201. However, a submarine cable system also includes a system using a frequency grid having a channel interval of 40 GHz or 33.3 GHz. Thus, when a WSS whose control unit of a frequency is 6.25 GHz or 12.5 GHz is used, a center frequency and a bandwidth of a band-pass filter may not coincide with a wavelength and a bandwidth of an optical signal included in a WDM signal at a channel interval of 40 GHz or 33.3 GHz. In this case, the WSS cannot separate the optical signal included in the WDM signal without affecting a spectrum. Meanwhile, when the WSS is changed to a WSS whose control unit is 40 GHz or a WSS whose control unit is 33.3 GHz, a WDM signal of a frequency grid having a channel interval other than 40 GHz or 33.3 GHz cannot be suitably separated. Further, a WSS whose unit of controlling is 0.1 GHz is eventually needed in order to comply with all channel intervals such as 50 GHz, 40 GHz, 33.3 GHz, and 25 GHz by reducing a control unit of the WSS to be smaller than 6.25 GHz. However, it is technically difficult to achieve a WSS that can perform such minute setting.

In such a background, a light wavelength separation circuit that is flexibly adaptable to various channel intervals of a WDM signal is required. However, PTLs 1 and 2 do not disclose a technique that satisfies such a request.

OBJECT OF INVENTION

An object of the present invention is to provide a technique for achieving a light wavelength separation device and a light wavelength separation method that are flexibly adaptable to various channel intervals of a WDM signal.

Solution to Problem

A light wavelength separation circuit of the present invention includes
an optical coupler for splitting a wavelength multiplexed optical signal acquired by multiplexing optical signals of a plurality of channels,
a band-pass filter being disposed for each output port of the optical coupler for separating the optical signals included in the wavelength multiplexed optical signal input from an output port of the optical coupler for each of the channels having center frequencies that are not adjacent to one another, and outputting the optical signal separated, from each of output ports different from one another, and
an optical switch for selecting one of paths of optical signals input from respective output ports of the band-pass filter.

A light wavelength separation method of the present invention includes
splitting a wavelength multiplexed optical signal acquired by multiplexing optical signals of a plurality of channels,
separating the optical signals included in the wavelength multiplexed optical signal for each of the channels having center frequencies that are not adjacent to one another for each of the wavelength multiplexed optical signal split, outputting the optical signals separated for each of the channels by using a band-pass filter, and selecting one of a plurality of paths from which the separated optical signal is output, and performing outputting.

Advantageous Effects of Invention

The present invention provides a light wavelength separation device and a light wavelength separation method that are flexibly adaptable to various channel intervals of a WDM signal.

BRIEF DESCRIPTION OF DRAWINGS

FIG. 2 is a table illustrating an example of a frequency grid of a WDM signal input to the light wavelength separation circuit 100.

FIG. 3 is a table illustrating an example of setting an ideal band-pass filter to each channel in the frequency grid in FIG. 2.

FIG. 4 is a table illustrating an example of selecting an output port number of the light wavelength separation circuit 100 and an input port of the optical switches 104 to 113 for a channel number.

FIG. 5 is a table illustrating an example of selecting an output port number of the light wavelength separation circuit 100 and an input port of the optical switches 104 to 113 for a channel number.

FIG. 6 is a table illustrating an example of setting a band-pass filter of WSSs 102 and 103 when a WDM signal of a frequency grid having a channel interval of 40 GHz is input to the light wavelength separation circuit 100.

FIG. 7 is a flowchart illustrating an example of a control procedure of the light wavelength separation circuit 100.

FIG. 8 is a table illustrating an example of setting an ideal band-pass filter to each channel in a frequency grid having a channel interval of 33.3 GHz.

FIG. 9 is a table illustrating an example of setting a band-pass filter of the WSSs 102 and 103 when a WDM signal at a channel interval of 33.3 GHz is input to the light wavelength separation circuit 100.

FIG. 13 is a diagram illustrating a configuration example of a general light wavelength separation circuit 201.

EXAMPLE EMBODIMENT

Example embodiments below describe a light wavelength separation circuit that separates a WDM signal at a channel interval unique to a submarine cable system and outputs the WDM signal by using a WSS adapted to the channel interval being mainly used in a land WDM transmission system. In the light wavelength separation circuit, the WSS that has a frequency grid having a channel interval of, for example, 50 GHz, 25 GHz, or 12.5 GHz and is adapted to the land WDM transmission system is used. Then, a WDM signal of a frequency grid having a channel interval of 40 GHz or 33.3 GHz is input to the light wavelength separation circuit. The light wavelength separation circuit separates the input WDM signal, and outputs an optical signal with any wavelength to any output port. The light wavelength separation circuit separates the WDM signal in such a way that wavelengths of optical signals do not compete with one another between output ports. Note that an arrow provided to a configuration example in each drawing of the example embodiments below exemplifies a direction of a signal for description, and does not limit a direction of the signal.

First Example Embodiment

Figure 1:
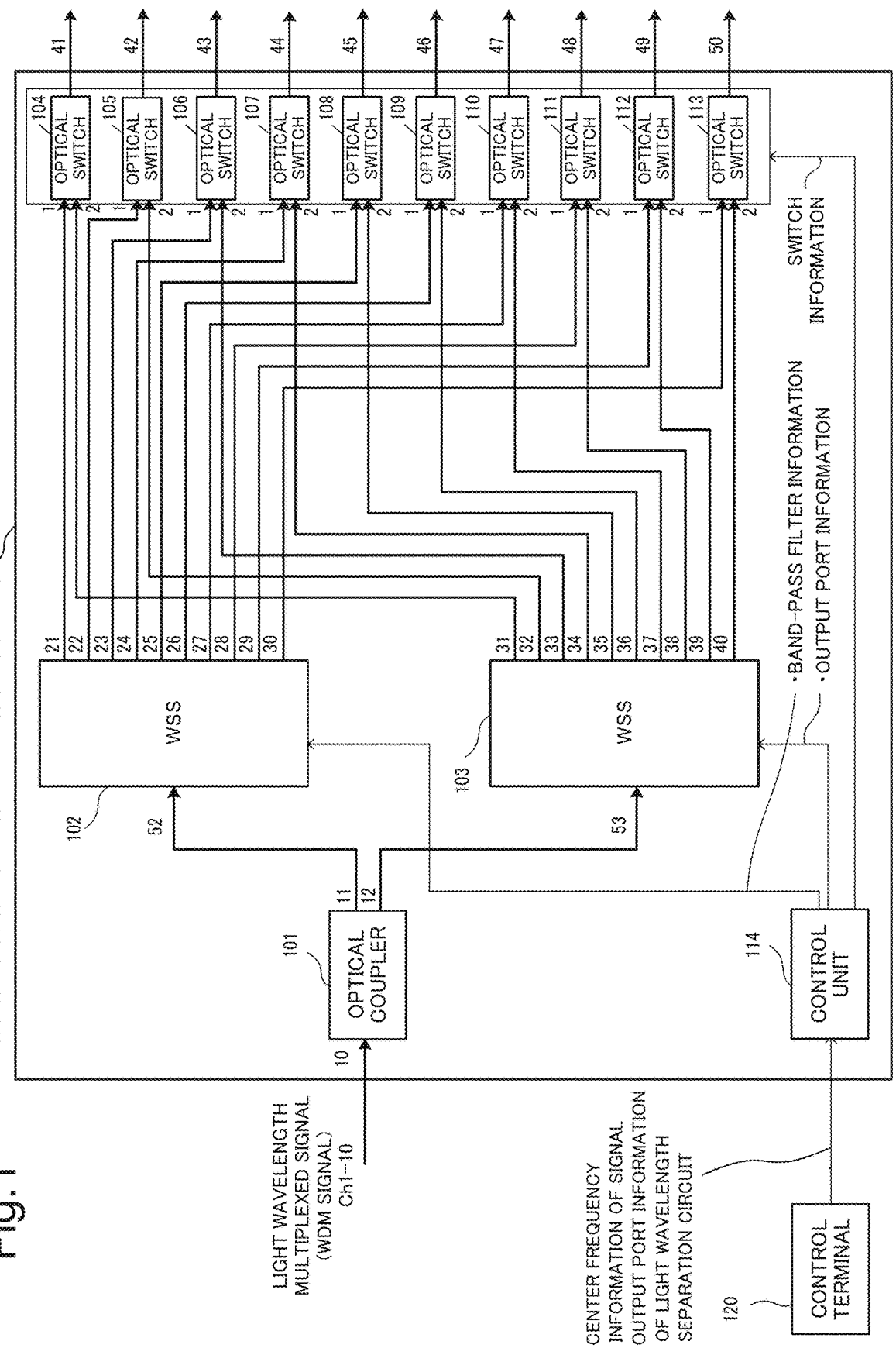
FIG. 1 is a block diagram illustrating a configuration example of a light wavelength separation circuit 100 according to a first example embodiment.

FIG. 1 is a block diagram illustrating a configuration example of a light wavelength separation circuit 100 according to a first example embodiment. In the light wavelength separation circuit 100, two 1×10 wavelength selective switches (WSSs) are arranged in parallel. One WSS (WSS 102) is set as a band-pass filter that separates an optical signal having an odd-numbered channel of a WDM signal. The other WSS (WSS 103) is set as a band-pass filter that separates an optical signal having an even-numbered channel. Ten 2×1 optical switches (optical switches 104 to 113) connected to outputs of the WSSs 102 and 103 select any of an odd-numbered channel and an even-numbered channel, and perform outputting. The light wavelength separation circuit having such a configuration can separate any wavelength in a range in which wavelengths do not compete with one another between ports, and perform outputting to any of 10 ports of the light wavelength separation circuit.

FIG. 2 is a table illustrating an example of a frequency grid of a wavelength multiplexed optical signal (WDM signal) input to the light wavelength separation circuit 100. The frequency grid is a group of center frequencies of optical signals constituting a WDM signal. The WDM signal illustrated in FIG. 2 having channels (Ch 1 to 10) aligned at an interval of 40 GHz in a direction from a center frequency of 193100.0 GHz to a lower frequency is input to an input port (namely, an input port 10 of an optical coupler 101) of the light wavelength separation circuit 100. A bandwidth of an optical signal of each of the channels is equal to a channel interval, and is symmetrical with respect to the center frequency. In other words, a bandwidth of an optical signal of each of the channels is ±20 GHz around the center frequency in FIG. 2.

The WDM signal input to the light wavelength separation circuit 100 is split into an output port 11 and an output port 12 of the optical coupler 101 in equal optical power. The WDM signal output from the output port 11 is input to an input port 52 of the WSS 102. The WDM signal output from the output port 12 is input to an input port 53 of the WSS 103.

The WSS 102 includes 10 output ports 21 to 30. A characteristic of a band-pass filter can be set between the input port 52 of the WSS 102 and each of the output ports 21 to 30. In the present example embodiment, a center frequency of the band-pass filter that can be set to the WSS 102 is in 12.5 GHz steps with reference to 193100.0 GHz. A bandwidth that can be set to the band-pass filter is also in 12.5 GHz steps. Further, light output of any port of the output ports 21 to 30 of the WSS 102 can be stopped. In the present example embodiment, the WSS 102 is set in such a way as to separate odd-numbered channels (Ch 1, 3, 5, 7, and 9) of optical signals of Ch 1 to 10 included in the WDM signal and output the odd-numbered channels.

Similarly to the WSS 102, the WSS 103 can set a characteristic of a band-pass filter between the input port 53 of the WSS 103 and each of output ports 31 to 40. Similarly to the WSS 102, the WSS 103 can also set a center frequency of the band-pass filter in steps of 12.5 GHz with reference to 193100.0 GHz. Further, a bandwidth of the band-pass filter is also variable in steps of 12.5 GHz. Then, output of any port of the output ports 31 to 40 can be stopped. In the present example embodiment, the WSS 103 is set in such a way as to separate even-numbered channels (Ch 2, 4, 6, 8, and 10) of the optical signals of Ch 1 to 10 included in the WDM signal and output the even-numbered channels.

Each of the optical switches 104 to 113 is an optical switch of two inputs and one output (2×1 optical switch). The output port 21 of the WSS 102 is connected to an input port 1 of the optical switch 104. The output port 31 of the WSS 103 is connected to an input port 2 of the optical switch 104. The optical switch 104 selects one of optical signals input from the output port 21 of the WSS 102 and the output port 31 of the WSS 103, and outputs the selected optical signal from an output port 41 of the light wavelength separation circuit 100.

Similarly, the output ports 22 to 30 of the WSS 102 are connected to input ports 1 of the optical switches 105 to 113, respectively. The output ports 32 to 40 of the WSS 103 are connected to input ports 2 of the optical switches 105 to 113, respectively. Then, the optical switches 105 to 113 select output of one of the WSS 102 and the WSS 103, and output the selected output from output ports 42 to 50 of the light wavelength separation circuit 100, similarly to the optical switch 104.

A control terminal 120 is disposed outside the light wavelength separation circuit 100. The control terminal 120 is, for example, a personal computer, and is connected to a control unit 114 with a communication line. The control terminal 120 presets, to the control unit 114, frequency grid information (namely, information about a center frequency and a bandwidth of Ch 1 to Ch 10) about a WDM signal input to the optical coupler 101, and a correspondence between the output ports 41 to 50 of the light wavelength separation circuit 100 and Ch 1 to 10. Based on this information, the control unit 114 performs setting of a band-pass filter for each output port by notifying the WSS 102 and the WSS 103 of setting information (band-pass filter information and output port information about the WSSs 102 and 103) about a band-pass filter. In the WSS 102 and the WSS 103, an output port that is not to be used is set in such a way as not to output an optical signal. Furthermore, the control unit 114 sets an input port of the optical switches 104 to 113 by notifying each of the optical switches 104 to 113 of information (switch information) about which the input ports 1 and 2 is selected for output. The WSS 102, the WSS 103, and the optical switches 104 to 113 set respective functions, based on an instruction from the control unit 114.

A function of the control unit 114 may be achieved by an electric circuit included in the control unit 114. Alternatively, the function of the control unit 114 may be achieved by a program executed by a central processing unit (CPU) included in the control unit 114. The program is recorded in a tangible and non-transitory recording medium. A semiconductor memory or a fixed magnetic disk device is used as the recording medium, which is not limited thereto. The CPU is, for example, a computer included in the control unit 114, but may be included in another place inside the light wavelength separation circuit 100.

The light wavelength separation circuit 100 can output any optical signal of Ch 1 to Ch 10 separated from the WDM signal to any of the output ports 41 to 50 by a setting change of a band-pass filter of the WSSs 102 and 103 and switching of an input of the optical switches 104 to 113 described above.

DESCRIPTION OF OPERATION

Setting of a band-pass filter and an output port of the WSS 102 and the WSS 103 and selection of an input port of the optical switches 104 to 113 will be described. The external control terminal 120 sets, to the control unit 114, a center frequency and a bandwidth (namely, information about a frequency grid) of Ch 1 to Ch 10 and information about a channel number of an optical signal output from each of the output ports 41 to 50 of the light wavelength separation circuit 100. The control unit 114 calculates, from the information about the frequency grid, a center frequency of a band-pass filter set to the WSS 102 and the WSS 103, and a lower limit and an upper limit of a transmission frequency (transmission start frequency and transmission termination frequency).

FIG. 3 is a table illustrating an example of setting an ideal band-pass filter to each channel in the frequency grid in FIG. 2. When an interval of a frequency grid of a WDM signal is 40 GHz, a bandwidth of an ideal band-pass filter is ±20 GHz around a center frequency. With reference to FIG. 3, for example, a center frequency of an optical signal of Ch 1 is 193100.0 GHz, a transmission start frequency is 193120.0 GHz higher by 20 GHz, and a transmission termination frequency is 193080.0 GHz lower by 20 GHz. The transmission start frequency is an upper limit of a transmission frequency (a lower limit of a transmission wavelength) of a band-pass filter, and the transmission termination frequency is a lower limit of the transmission frequency (an upper limit of the transmission wavelength). In other words, it is ideal that a center frequency of a band-pass filter is equal to a center frequency of an optical signal, and a bandwidth is equal to an interval of a frequency grid. However, a center frequency and a bandwidth that can be set to a band-pass filter of the WSSs 102 and 103 depend on a frequency that can be set to the WSSs 102 and 103. Thus, there may be a case where the center frequency and the bandwidth of the band-pass filter are not an ideal value in the frequency grid of the WDM signal input to the light wavelength separation circuit 100.

Thus, in the present example embodiment, the WSS 102 is set as a band-pass filter that outputs an optical signal of an odd-numbered channel. Even when a center frequency of the band-pass filter does not strictly coincide with a center frequency of the odd-numbered channel, an optical signal of the assigned odd-numbered channel can be transmitted as long as a transmission start frequency and a transmission termination frequency contain a band needed for the optical signal of the odd-numbered channel. Specifically, the control unit 114 may set, to the WSS 102, a band-pass filter that transmits Ch 1, Ch 3, Ch 5, Ch 7, and Ch 9 to predetermined five ports of the output ports 21 to 30 of the WSS 102.

Similarly, the WSS 103 is set as a band-pass filter that outputs an optical signal of an even-numbered channel. An optical signal of the assigned even-numbered channel can be transmitted as long as a transmission start frequency and a transmission termination frequency contain a band needed for the optical signal of the even-numbered channel. Specifically, the control unit 114 may set, to the WSS 103, a band-pass filter that transmits Ch 2, Ch 4, Ch 6, Ch 8, and Ch 10 to predetermined five ports of the output ports 31 to 40 of the WSS 103. A correspondence between an output port of the WSSs 102 and 103 and a channel is set based on a correspondence between the output ports 41 to 50 and a channel to be output, which is set from the control terminal 120.

Herein, by setting the WSS 102 for the odd-numbered channel and the WSS 103 for the even-numbered channel, every other wavelength of an optical signal to be transmitted is set on the frequency grid in each of the WSSs. By such setting, even in a case where an optical signal of another channel is included within a transmission band of a band-pass filter to which a transmission bandwidth wider than an ideal value is set in the WSSs 102 and 103, only a channel to be received can be selected and received when a digital coherent receiver is used. Thus, a signal does not degrade. Furthermore, using the different WSSs for the odd-numbered channel and the even-numbered channel avoids a problem that frequency ranges of band-pass filters overlapping one another cannot be set in each of the WSSs 102 and 103.

FIGS. 4 and 5 are tables each illustrating an example of selecting an output port number of the light wavelength separation circuit 100 and an input port of the optical switches 104 to 113 for a channel number of an optical signal included in a WDM signal. A selection position is set to each of the optical switches 104 to 113 in association with the output ports 41 to 50 of the light wavelength separation circuit 100. Setting of the optical switches 104 to 113 is determined by a relationship between a center wavelength of Ch 1 to Ch 10 set by the control unit 114 and the output ports 41 to 50 of the light wavelength separation circuit 100.

FIG. 4 is an example in which the output ports 41 to 50 of the light wavelength separation circuit 100 output an optical signal in order of channel numbers. In this case, the output ports 21, 23, 25, 27, and 29 of the WSS 102 output optical signals of Ch 1, Ch 3, Ch 5, Ch 7, and Ch 9, respectively. Then, the output ports 32, 34, 36, 38, and 40 of the WSS 103 output optical signals of Ch 2, Ch 4, Ch 6, Ch 8, and Ch 10, respectively. Furthermore, the optical switches 104, 106, 108, 110, and 112, whose output port number of the light wavelength separation circuit 100 is odd (41, 43, 45, 47, and 49), select the input port 1 on the WSS 102 side. Further, the optical switches 105, 107, 109, 111, and 113, whose output port number of the light wavelength separation circuit 100 is even (42, 44, 46, 48, and 50), select the input port 2 on the WSS 103 side.

FIG. 5 is an example of assigning Ch 1, 3, 5, 7, and 9 to the output ports 41 to 45 of the light wavelength separation circuit 100, and assigning Ch 2, 4, 6, 8, and 10 to the output ports 46 to 50. In this case, the output ports 21, 22, 23, 24, and 25 of the WSS 102 output optical signals of Ch 1, Ch 3, Ch 5, Ch 7, and Ch 9, respectively. Then, the output ports 36, 37, 38, 39, and 40 of the WSS 103 output optical signals of Ch 2, Ch 4, Ch 6, Ch 8, and Ch 10, respectively. Furthermore, the optical switches 104 to 108, whose output port number of the light wavelength separation circuit 100 is 41 to 45, select the input port 1 on the WSS 102 side. Further, the optical switches 109 to 113, whose output port number of the light wavelength separation circuit 100 is 46 to 50, select the input port 2 on the WSS 103 side.

Calculation Procedure of Setting Band-Pass Filter

FIG. 6 is a table illustrating an example of setting a band-pass filter of the WSSs 102 and 103 when a WDM signal of a frequency grid having a channel interval of 40 GHz is input to the light wavelength separation circuit 100. A method of calculating a transmission frequency of the band-pass filter of the WSSs 102 and 103 will be described with a case where the channel interval of the frequency grid is 40 GHz as an example. In FIG. 6, the WSS 102 separates and outputs an optical signal of an odd-numbered channel, and the WSS 103 separates and outputs an optical signal of an even-numbered channel. As described in FIGS. 4 and 5, an output port of each channel in the WSSs 102 and 103 is determined by setting of the output port of the light wavelength separation circuit 100, and thus the output port is not illustrated in FIG. 6. Hereinafter, the WSSs 102 and 103 are collectively described as a WSS.

(1) Setting of Center Frequency

A frequency that is the closest to a center frequency of an optical signal to be transmitted and can be set to the WSS is selected as a center frequency set to a band-pass filter. In the present example embodiment, it is assumed that the center frequency that can be set to the band-pass filter of the WSS is a frequency in 12.5 GHz steps with reference to 193100.0 GHz. Therefore, a multiple of 12.5 closest to the frequency (GHz) of the optical signal to be transmitted is set as the center frequency (GHz). For example, a center frequency of an optical signal of Ch 5 is 192940.0 GHz as illustrated in FIG. 6. Therefore, a center frequency of the band-pass filter that transmits the optical signal of Ch 5 is set to 192937.5 (=12.5×15435) GHz. Center frequencies of the band-pass filter of other channels are also similarly calculated.

(2) Calculation of Transmission Start Frequency

It is assumed that a transmission start frequency is a frequency in 12.5 GHz steps that is the closest to a frequency just between center frequencies of band-pass filters of adjacent channels on a short wavelength side (high frequency side) being set to the same WSS and is higher than the frequency. For example, a channel on the high frequency side adjacent to Ch 5 set to the WSS 102 is Ch 3, and a center frequency of the band-pass filter of Ch 3 is 193025.0 GHz. Therefore, a frequency between Ch 3 and Ch 5 is 192981.25 GHz. A multiple of 12.5 that is lower than and is the closest to this frequency is 192975.0, and thus a transmission start frequency of Ch 5 is 192975.0 GHz.

(3) Calculation of Transmission Termination Frequency

It is assumed that a transmission termination frequency is a frequency in 12.5 GHz steps that is the closest to a frequency just between center frequencies of band-pass filters of adjacent channels on a long wavelength side (low frequency side) being set to the same WSS and is higher than the frequency. For example, a channel on the low frequency side that is adjacent to Ch 5 and is set in the WSS 102 is Ch 7, and a center frequency of the band-pass filter is 192862.5 GHz. Therefore, a frequency between Ch 5 and Ch 7 is 192900.0 GHz. Since this frequency is a multiple of 12.5, a transmission termination frequency of Ch 5 is 192900.0 GHz.

FIG. 6 illustrates a set frequency of a band-pass filter calculated by the procedure of (1) to (3) described above. In comparison with the setting of the ideal band-pass filter illustrated in FIG. 3, a transmission band of the band-pass filter of each of the channels in FIG. 6 contains a transmission bandwidth of each of the channels in FIG. 3. Thus, even when the setting in FIG. 6 is used, a spectrum of an optical signal of each of the channels is not subjected to attenuation by the band-pass filter.

Setting of a band-pass filter will be described by using mathematical expressions.

When a center frequency of an optical signal is represented as fs (GHz), a function that rounds x to y digit after the decimal point is represented as ROUND (x, y), a function indicated by a value acquired by rounding down x to y digit after the decimal point is represented as ROUNDDOWN (x, y), a center frequency interval of band-pass filters between adjacent channels that transmit the optical signal in the same WSS is represented as fb, a center frequency of the band-pass filter of the WSS is represented as fc (GHz), a transmission start frequency is represented as f1, and a transmission termination frequency is represented as f2, the calculation of (1) to (3) described above is given by the following equations 1 to 3. Note that, in a configuration of the present example embodiment in which the two WSSs are used and the channel interval of the frequency grid is 40 GHz, the interval fb between the adjacent channels in the same WSS is 80 GHz.

$$fc=\text{ROUND}(fs\div 12.5,0)\times 12.5 \quad \text{(Equation 1)}$$

$$f1=fc+12.5\times\text{ROUNDDOWN}(fb\div 2\div 12.5,0) \quad \text{(Equation 2)}$$

$$f2=fc-12.5\times\text{ROUNDDOWN}(fb\div 2\div 12.5,0) \quad \text{(Equation 3)}$$

The equation 1 is an equation that acquires a multiple of 12.5 closest to fc. The equation 2 and the equation 3 are an equation that acquires the transmission start frequency f1 and the transmission termination frequency f2 in such a way as to set a transmission band immediately to the inside of a frequency just between the adjacent channels. In the present example embodiment, y=0, ROUND (x, 0) represents an integer value acquired by rounding off x to an integer, and ROUNDDOWN (x, 0) represents an integer value acquired by rounding down x to an integer.

According to the equation 2 and the equation 3, a maximum transmission bandwidth is fb, which is twice as wide as a bandwidth of the optical signal. With reference to FIG. 6 being a specific calculation example, a transmission bandwidth set to the band-pass filter is 75 GHz (192900.0 GHz to 192975.0 GHz) in a case of Ch 5, and is extremely wider than a bandwidth (40 GHz) of the optical signal. Since it is sufficient that a transmission bandwidth of the band-pass filter has equal to or greater than ±20 GHz with reference to a center frequency of the optical signal, the transmission start frequency f1 and the transmission termination frequency f2 may be set in such a way that the transmission bandwidth of the band-pass filter is narrower than the above-described range. For example, the transmission start frequency f1 of Ch 5 may be 192962.5 GHz, and the transmission termination frequency f2 may be 192912.5 GHz (namely, 192937.5±25 GHz). Even in such setting, the optical signal of Ch 5 in the frequency range of 192940.0±20 GHz can be transmitted. In other words, when it is assumed that a channel interval of a frequency grid is fg (40 GHz), the transmission start frequency f1 and the transmission termination frequency f2 may be acquired from the following equations 4 and 5.

$$f1\geq fc+(fg\div 2) \quad \text{(Equation 4)}$$

$$f2\leq fc-(fg\div 2) \quad \text{(Equation 5)}$$

Note that the transmission start frequency f1 and the transmission termination frequency f2 acquired in the equation 4 and the equation 5 also need to be determined in such a way that a range of a transmission frequency of a band-pass filter does not exceed the range by f1 and f2 acquired in the equation 2 and the equation 3.

FIG. 7 is a flowchart illustrating an example of a control procedure of the light wavelength separation circuit 100 according to the first example embodiment. The control unit 114 reads information about a frequency grid of an input WDM signal from the control terminal 120 (Step S01 in FIG. 7). Next, a center frequency fc of the WSS 102 or the WSS 103 is acquired and set to an unset channel (Step S02).

Then, a transmission start frequency f1 is acquired and set (Step S03), and a transmission termination frequency f2 is acquired and set (Step S04). Steps S03 and S04 may be in a reverse order, or may be performed in parallel. Setting to the WSS may be performed after calculation of all channels or all the WSSs is terminated. In Steps S02 to S04, a frequency can be calculated by using the equations 1 to 3.

When setting of the channels is not finished in the WSS being an object to the setting (Step S05: NO), an unset channel is selected as an object to calculation (Step S06). In this case, calculation and setting of the center frequency fc, the transmission start frequency f1, and the transmission termination frequency f2 of the band-pass filter continue for the selected channel. After the calculation and the setting of all the channels are finished (Step S05: YES), when an unset WSS is present (Step S07: NO), the unset WSS is selected, and the procedure of Steps S02 to S05 is performed.

When the setting of all the WSSs is terminated (Step S07: YES), input ports of the optical switches 104 to 113 are switched based on the setting of "switch selection position" in FIG. 4 or 5, for example (Step S09).

The setting of the WSSs 102 and 103 when the WDM signal of the frequency grid having the channel interval of 40 GHz is separated is described above. However, the setting procedure described above is also applicable to a case other than when the channel interval is 40 GHz.

FIG. 8 is a table illustrating an example of setting an ideal band-pass filter to each channel in a frequency grid having a channel interval of 33.3 GHz. Transmission bandwidth of 33.3 GHz is set for any of the channels.

FIG. 9 is a table illustrating an example of setting a band-pass filter of the WSSs 102 and 103 when a WDM signal at a channel interval of 33.3 GHz is input to the light wavelength separation circuit 100. Even when the channel interval is 33.3 GHz, a set value of the band-pass filter can also be acquired by using the equations 1 to 3 by setting fg=33.3 GHz (that is, fb=66.6 GHz). In comparison with the ideal set value in FIG. 8, a transmission band of the band-pass filter of the set value in FIG. 9 contains the transmission band illustrated in FIG. 8. Thus, even when the setting in FIG. 9 is used, a spectrum of an optical signal of each of the channels is not subjected to attenuation by the band-pass filter.

As described above, the light wavelength separation circuit 100 includes the two WSSs (WSSs 102 and 103). The WSS 102 outputs an optical signal of an odd-numbered channel of a frequency grid from any output port, and the WSS 103 outputs an optical signal of an even-numbered channel from any output port. Herein, the WSSs 102 and 103 set a transmission bandwidth of an output port set to each of the WSSs to be equal to or greater than a bandwidth of one channel and equal to or less than twice the bandwidth of one channel. In this way, even when a center frequency set to an output port of the WSSs 102 and 103 does not coincide with a center frequency of an optical signal passing through the port, the optical signal can be passed without affecting a spectrum. Further, transmission bands can be prevented from overlapping each other between adjacent channels being set in the WSS.

Furthermore, the light wavelength separation circuit 100 selects an output of the WSSs 102 and 103 with the optical switches 104 to 113. As a result, an input WDM signal (Ch 1 to 10) can be output from any output port of the light wavelength separation circuit 100.

Modification Example of First Example Embodiment

In FIG. 1, the light wavelength separation circuit 100 in which the WSS 102 outputs an optical signal of an odd-numbered channel, and the WSS 103 outputs an optical signal of an even-numbered channel is described. However, a WDM signal may be divided into three groups or more of channels by using three or more WSSs. For example, a light wavelength separation circuit may have a configuration in which a WDM signal of a frequency grid including optical signals of Ch 1 to Ch 12 having different center frequencies is split into three by a 1×3 optical coupler, and the split WDM signals are respectively input to first, second, and third WSSs. For example, the first WSS outputs optical signals of "Ch 1, 4, 7, and 10", the second WSS outputs optical signals of "Ch 2, 5, 8, and 11", and the third WSS outputs optical signals of "Ch 3, 6, 9, and 12". Then, each of twelve 3×1 optical switches provided in parallel at an output of the light wavelength separation circuit may select any of outputs of the first to third WSSs and perform outputting.

In this case, the control unit 114 performs setting of a band-pass filter and an optical switch of the first to third WSSs, based on information about which port of the 12 optical switches outputs Ch 1 to Ch 12 and information about a frequency grid of Ch 1 to Ch 12. The procedure of the light wavelength separation circuit 100 in FIG. 1 can be applied to a procedure of setting a band-pass filter. In other words, in each of the WSSs, a center frequency close to a center frequency of an optical signal of a channel to be transmitted is set as a center frequency of a band-pass filter, and a transmission start frequency and a transmission termination frequency are set in such a way as to have a band wider than a band of the optical signal of the channel to be transmitted.

In general, when a WDM signal is separated by using N (N is an integer of two or more) WSSs, the N WSSs are disposed in parallel. Then, N×1 optical switches are disposed in parallel in outputs of the WSSs, and select any of the outputs of the N WSSs, and perform outputting from the light wavelength separation circuit. The number of parallel connections of the optical switches is the number of maximum channels for simultaneous output.

The case where the channel interval of the frequency grid is 40 GHz or 33.3 GHz is described in the description above. However, the equations 1 to 5 are also applicable to a frequency grid having another value of a channel interval (50 GHz, 37.5 GHz, or 25 GHz, for example). Further, when a minimum unit of a frequency that can be set to the WSS is other than 12.5 GHz, a frequency set to a band-pass filter of the WSS can be acquired by replacing "12.5" in the equations 1 to 3 with a corresponding value.

DESCRIPTION OF EFFECT

The light wavelength separation circuit 100 can separate and output an optical signal even in a case of a WDM signal including an optical signal having a frequency other than a frequency that can be set to the WSSs 102 and 103. The light wavelength separation circuit 100 having such a configuration is applicable to an optical submarine transmission system that adopts a frequency grid having a channel interval different from that of a frequency grid that can be set to the WSS.

Further, an interval of a frequency grid is not limited to the example described above. For example, even when an interval of a frequency grid is 50 GHz, 37.5 GHz, 33.3 GHz, and 25 GHz, a setting procedure of each unit is similar. Even in such a case, any channel can be separated and output to any output port of the light wavelength separation circuit 100 by setting the WSS and the optical switch, based on information about the frequency grid and a relationship between the output port of the light wavelength separation circuit 100 and the channel.

Note that the light wavelength separation circuit 100 that achieves the effect described above can also be expressed as the following minimum configuration. That is, the light wavelength separation circuit 100 includes the optical coupler 101, the WSSs 102 and 103, and the optical switches 104 to 113. The optical coupler 101 splits a WDM signal acquired by multiplexing optical signals of a plurality of channels. The WSSs 102 and 103 are disposed for each output port of the optical coupler 101, and function as a band-pass filter. The WSSs 102 and 103 separate an optical signal included in the WDM optical signal input from the output port of the optical coupler 101 for each of channels having center frequencies that are not adjacent to one another, and output the separated optical signal from output ports different from one another. The optical switches 104 to 113 select any one of paths of the optical signals input from the output ports of the WSSs 102 and 103.

Second Example Embodiment

Figure 10:
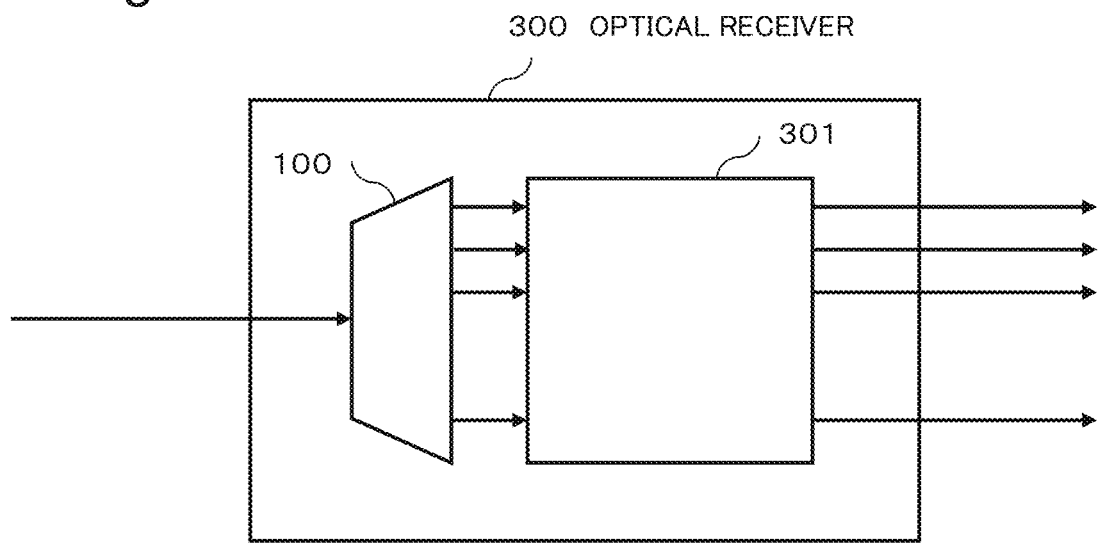
FIG. 10 is a block diagram illustrating a configuration example of an optical receiver 300 according to a second example embodiment.

FIG. 10 is a block diagram illustrating a configuration example of an optical receiver 300 according to a second example embodiment of the present invention.

The optical receiver 300 includes a photoelectric conversion circuit 301 and the light wavelength separation circuit 100 described in the first example embodiment. The photoelectric conversion circuit 301 converts each optical signal separated for each channel being output from the light wavelength separation circuit 100 into an electric signal. The photoelectric conversion circuit 301 may include a light receiving element such as a photodiode, and an amplifier that amplifies an electric signal output from the light receiving element.

With the photoelectric conversion circuit 301 and the light wavelength separation circuit 100 according to the first example embodiment, the optical receiver 300 having such a configuration can separate a WDM signal for each channel, and output the signal as an electric signal. As a result, the optical receiver 300 achieves an effect similar to that of the first example embodiment the effect being flexibly adaptable to various channel intervals of a WDM signal.

Third Example Embodiment

Figure 11:
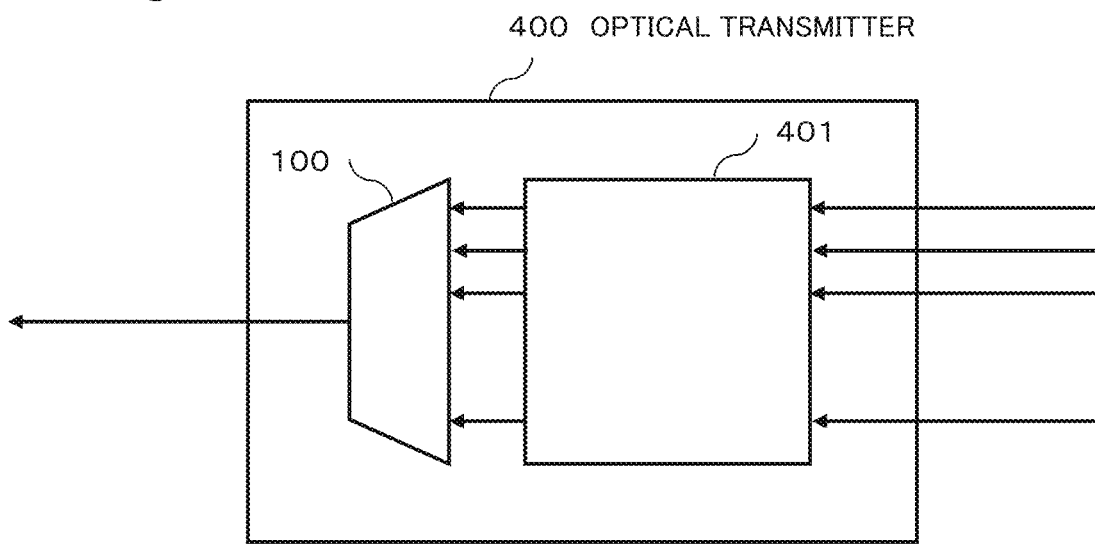
FIG. 11 is a block diagram illustrating a configuration example of an optical transmitter 400 according to a third example embodiment.

FIG. 11 is a block diagram illustrating a configuration example of an optical transmitter 400 according to a third example embodiment of the present invention.

The optical transmitter 400 includes an electric-optic conversion circuit 401 and the light wavelength separation circuit 100 described in the first example embodiment. The electric-optic conversion circuit 401 is, for example, a light emitting element such as a semiconductor laser diode, and converts an input electric signal into an optical signal of a frequency grid having a predetermined channel interval, and outputs the optical signal to an output port of the light wavelength separation circuit 100.

Each optical part constituting the light wavelength separation circuit 100 described in the first example embodiment functions regardless of an orientation of a transmitted optical signal. Therefore, the light wavelength separation circuit 100 can multiplex optical signals having center wavelengths different from one another being input from the output ports 41 to 50, and generate a WDM signal. In this case, the optical switches 104 to 113, the WSS 102, and the WSS 103 of the light wavelength separation circuit 100 are set in such a way that, for example, an odd-numbered channel of an optical signal input to the output port is input to the WSS 102, and an even-numbered channel is distributed to the WSS 103.

With the electric-optic conversion circuit 401 and the light wavelength separation circuit 100 according to the first example embodiment, the optical transmitter 400 can multiplex optical signals generated in the electric-optic conversion circuit 401 in the wavelength separation circuit, and output the optical signal as a WDM signal. As a result, even in a case of a frequency having a channel interval of the optical signal input from the electric-optic conversion circuit 401 other than a channel interval that can be set to the WSSs 102 and 103, the optical signal can be separated and output. In other words, the optical transmitter 400 achieves an effect capable of multiplexing optical signals at various channel intervals and generating a WDM signal.

Fourth Example Embodiment

Figure 12:
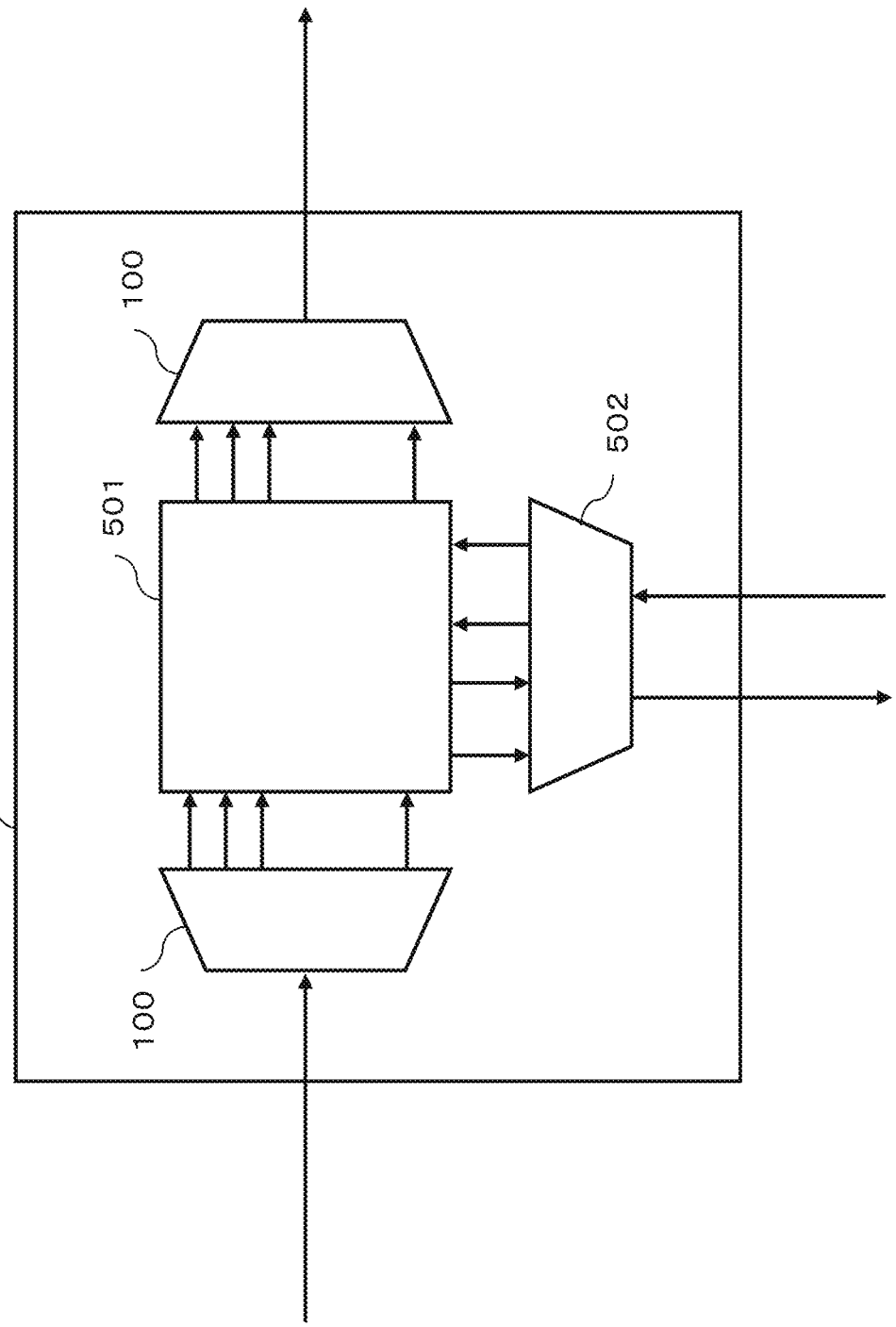
FIG. 12 is a block diagram illustrating a configuration example of an optical node 500 according to a fourth example embodiment.

FIG. 12 is a block diagram illustrating a configuration example of an optical node 500 according to a fourth example embodiment of the present invention.

The optical node 500 includes an optical matrix switch 501, an optical multiplexing/demultiplexing circuit 502, and the light wavelength separation circuit 100 described in the first example embodiment. The optical matrix switch 501 is a known optical part that can switch an output destination of a plurality of input optical signals.

The light wavelength separation circuit 100 (first light wavelength separation circuit) on the left side of FIG. 12 separates a WDM signal input from the outside of the optical node 500, and outputs the WDM signal to the optical matrix switch 501. The light wavelength separation circuit 100 (second light wavelength separation circuit) on the right side of FIG. 12 multiplexes optical signals output from the optical matrix switch 501, and outputs the multiplexed WDM signal to the outside of the optical node 500.

The optical multiplexing/demultiplexing circuit 502 multiplexes optical signals output from the optical matrix switch 501, and outputs the multiplexed WDM signal to the outside of the optical node 500, and also separates a WDM signal input from the outside of the optical node 500, and outputs the WDM signal to the optical matrix switch 501.

The optical node 500 according to the present example embodiment can flexibly comply with an optical transmission system in which optical signals at various channel intervals are used by using the light wavelength separation circuit 100 for separating or synthesizing a WDM signal.

Note that the optical multiplexing/demultiplexing circuit 502 may be replaced with two light wavelength separation circuits 100, one may be used for multiplexing optical signals output from the optical matrix switch 501, and the other may be used for demultiplexing a WDM signal input from the outside. This configuration can also achieve flexible setting to a channel interval of an optical signal being input and output via the light multiplexing/demultiplexing circuit 502.

The example embodiments of the present invention can be described as, but not limited to, the following supplementary notes.

Supplementary Note 1

A light wavelength separation circuit, comprising:
an optical coupler for splitting a wavelength multiplexed optical signal acquired by multiplexing optical signals of a plurality of channels;
a band-pass filter being disposed for each output port of the optical coupler for separating the optical signals included in the wavelength multiplexed optical signal input from an output port of the optical coupler for each of the channels having center frequencies that are not adjacent to one another, and outputting the optical signal separated, from each of output ports different from one another; and
an optical switch for selecting one of paths of optical signals input from respective output ports of the band-pass filter.

Supplementary Note 2

The light wavelength separation circuit according to supplementary note 1, wherein
a center frequency of the band-pass filter and a bandwidth of the band-pass filter are set, based on a frequency in a minimum unit that can be set to the band-pass filter, and a center frequency of the optical signal and a bandwidth of the optical signal.

Supplementary Note 3

The light wavelength separation circuit according to supplementary note 2, wherein
a center frequency of the band-pass filter and a bandwidth of the band-pass filter are set in such a way as to be a multiple of the frequency in the minimum unit.

Supplementary Note 4

The light wavelength separation circuit according to supplementary note 2 or 3, wherein
a center frequency of the band-pass filter and a bandwidth of the band-pass filter contain a band of the optical signal.

Supplementary Note 5

The light wavelength separation circuit according to any one of supplementary notes 2 to 4, wherein
the band-pass filter is a wavelength selective switch that can set a center frequency of the band-pass filter and a bandwidth of the band-pass filter for each output port of the band-pass filter.

Supplementary Note 6

The light wavelength separation circuit according to any one of supplementary notes 1 to 5, further comprising
a control circuit for setting, based on information about a center frequency and a bandwidth of an optical signal included in the wavelength multiplexed optical signal and information about a frequency of the optical signal output from the optical switch, the center frequency and the bandwidth, and switching the optical switch.

Supplementary Note 7

An optical receiver, comprising:
the light wavelength separation circuit according to any one of supplementary notes 1 to 6; and
a photoelectric conversion circuit for converting each optical signal separated for each channel being output from the light wavelength separation circuit into an electric signal.

Supplementary Note 8

An optical transmitter, comprising:
the light wavelength separation circuit according to any one of supplementary notes 1 to 6; and
an electric-optic conversion circuit for converting an input electric signal into optical signals having center wavelengths different from one another for each channel, and outputting the optical signals to an output port of the light wavelength separation circuit, wherein
the light wavelength separation circuit multiplexes the optical signals input from an output port of the light wavelength separation circuit, and generates a WDM signal.

Supplementary Note 9

An optical node, comprising:
an optical matrix switch;
an optical multiplexing/demultiplexing circuit for multiplexing optical signals output from the optical matrix switch, and outputting a wavelength multiplexed optical signal, and also separating an input wavelength multiplexed optical signal and outputting a resultant signal of the separating to the optical matrix switch;
a first light wavelength separation circuit; and
a second light wavelength separation circuit, wherein
the first and second light wavelength separation circuits are the light wavelength separation circuits according to any one of supplementary notes 1 to 6, and
the first light wavelength separation circuit separates an input wavelength multiplexed optical signal for each channel, and performs outputting to the optical matrix switch, and the second light wavelength separation circuit multiplexes optical signals output from the optical matrix switch, and outputs a multiplexed and generated wavelength multiplexed optical signal to an outside.

Supplementary Note 10

A light wavelength separation method, comprising:
splitting a wavelength multiplexed optical signal acquired by multiplexing optical signals of a plurality of channels;
separating the optical signals included in the wavelength multiplexed optical signal for each of the channels having center frequencies that are not adjacent to one another for each of the wavelength multiplexed optical signal split;
outputting the optical signals separated for each of the channels by using a band-pass filter; and
selecting one of a plurality of paths from which the separated optical signal is output, and performing outputting.

Supplementary Note 11

The light wavelength separation method according to supplementary note 10, wherein
a center frequency of the band-pass filter and a bandwidth of the band-pass filter are set, based on a frequency in a minimum unit that can be set to the band-pass filter, and a center frequency of the optical signal and a bandwidth of the optical signal.

Supplementary Note 12

The light wavelength separation method according to supplementary note 11, wherein
a center frequency of the band-pass filter and a bandwidth of the band-pass filter are set in such a way as to be a multiple of the frequency in the minimum unit.

Supplementary Note 13

The light wavelength separation method according to supplementary note 11 or 12, wherein
a center frequency of the band-pass filter and a bandwidth of the band-pass filter are set in such a way as to contain a band of the optical signal.

Supplementary Note 14

A control program of a light wavelength separation circuit for causing a computer of a light wavelength separation circuit to perform:
a procedure of controlling a band-pass filter disposed for each output port of an optical coupler that splits a wavelength multiplexed optical signal acquired by multiplexing optical signals of a plurality of channels in such a way as to separate the optical signals included in the wavelength multiplexed optical signal input from an output port of the optical coupler for each of the channels having center frequencies that are not adjacent to one another, and output the optical signal split, from each of output ports different from one another; and
a procedure of controlling an optical switch in such a way as to select any one of paths of optical signals input from respective output ports of the band-pass filter.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the configuration described in each of the example embodiments is not necessarily exclusive. The action and effects of the present invention may be achieved by a configuration combining the whole or a part of the above-mentioned example embodiments.

This application is based upon and claims the benefit of priority from Japanese patent application No. 2017-146888, filed on Jul. 28, 2017, the disclosure of which is incorporated herein in its entirety by reference.

REFERENCE SIGNS LIST

100 Light wavelength separation circuit
101 Optical coupler
104 to 113 Optical switch
114 Control unit 120 Control terminal
201 Light wavelength separation circuit
300 Optical receiver
301 Photoelectric conversion circuit
400 Optical transmitter
401 Electric-optic conversion circuit
500 Optical node
501 Optical matrix switch
502 Optical multiplexing/demultiplexing circuit

The invention claimed is:

1. An optical transmission apparatus, comprising:
an optical coupler configured to split a wavelength multiplexed optical signal into a first split signal and a second split signal;
a first wavelength selective switch configured to filter the first split signal by a first band-pass filter and output a first optical signal;
a second wavelength selective switch configured to filter the second split signal by a second band-pass filter and output a second optical signal;
a controller configured to:
set, based on a first frequency grid corresponding to the first optical signal and a frequency that can be set to the first band-pass filter, the first band-pass filter, and
set, based on a second frequency grid corresponding to the second optical signal and a frequency that can be set to the second band-pass filter, the second band-pass filter,
wherein the first optical signal is odd-numbered channel and the second optical signal is even-numbered channel; and
further comprising an optical switch connected with the first wavelength selective switch and the second wavelength selective switch, wherein
the controller is further configured to switch a path of the optical switch based on the first frequency grid and the second frequency grid.

2. The optical transmission apparatus according to claim 1, wherein
a center frequency and a bandwidth of the first band-pass filter contain a band of the first optical signal.

3. The optical transmission apparatus according to claim 1, wherein
the controller is configured to set, based on information about the first optical signal,
the second optical signal, and an output optical signal from the optical switch, the first band-pass filter, and switch the optical switch.

4. The optical transmission apparatus according to claim 1 further comprising a photoelectric conversion circuit configured to convert each optical signal separated for each channel being output from the optical switch into an electric signal.

5. The optical wavelength separation apparatus according to claim 1 further comprising an electric-optic conversion circuit configured to convert an input electric signal into optical signal, and output the optical signal to the optical switch.

6. An optical transmission apparatus, comprising:
an optical coupler configured to split a wavelength multiplexed optical signal into a first split signal and a second split signal;
a first wavelength selective switch configured to filter the first split signal by a first band-pass filter and output a first optical signal;
a second wavelength selective switch configured to filter the second split signal by a second band-pass filter and output a second optical signal; and
a controller configured to:
set, based on a first frequency grid corresponding to the first optical signal and a frequency that can be set to the first band-pass filter, the first band-pass filter, and
set, based on a second frequency grid corresponding to the second optical signal and a frequency that can be set to the second band-pass filter, the second band-pass filter,
wherein the first optical signal is odd-numbered channel and the second optical signal is even-numbered channel, and
wherein a center frequency and a bandwidth of the first band-pass filter are set in such a way as to be a multiple of the frequency in the minimum unit.

7. An optical transmission method, comprising:
splitting a wavelength multiplexed optical signal into a first split signal and a second split signal;
filtering the first split signal by a first band-pass filter and outputting a first optical signal;
filtering the second split signal by a second band-pass filter and outputting a second optical signal;
setting, based on a first frequency grid corresponding to the first optical signal and a frequency that can be set to the first band-pass filter, the first band-pass filter; and
setting, based on a second frequency grid corresponding to the second optical signal and a frequency that can be set to the second band-pass filter, the second band-pass filter,
wherein the first optical signal is odd-numbered channel and the second optical signal is even-numbered channel, and
the method further comprising switching a path of an optical switch based on the first frequency grid and the second frequency grid.

8. The optical transmission method according to claim 7, wherein
a center frequency and a bandwidth of the first band-pass filter are set in such a way as to be a multiple of the frequency in the minimum unit.

9. The optical transmission method according to claim 7, wherein
a center frequency and a bandwidth of the first band-pass filter contain a band of the first optical signal.

10. The optical transmission method according to claim 7, further comprising setting, based on information about the first optical signal, the second optical signal, and an output optical signal from the optical switch, the first band-pass filter, and switching the optical switch.

11. The optical transmission method according to claim 7 further comprising converting each optical signal separated for each channel being output from the optical switch into an electric signal.

12. The optical wavelength method apparatus according to claim 7 further comprising converting an input electric signal into optical signal, and outputting the optical signal to the optical switch.

* * * * *